(12) United States Patent
Oshio

(10) Patent No.: US 6,240,434 B1
(45) Date of Patent: May 29, 2001

(54) FINITE IMPULSE RESPONSE CIRCUIT AND DISK UNIT

(75) Inventor: Umeo Oshio, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/205,959

(22) Filed: Dec. 4, 1998

(30) Foreign Application Priority Data

Dec. 25, 1997 (JP) ........................................ 9-357995

(51) Int. Cl.[7] .............................. G06F 17/10; G11B 5/09
(52) U.S. Cl. ........................................ 708/322; 360/45
(58) Field of Search .................................. 708/300, 301, 708/319, 322, 323; 360/45, 46

(56) References Cited

U.S. PATENT DOCUMENTS

| | | | |
|---|---|---|---|
| 4,907,100 | * | 3/1990 | Nishiyama et al. ............... 360/45 |
| 5,008,761 | * | 4/1991 | Nishiyama et al. ............... 360/45 |
| 6,043,943 | * | 3/2000 | Rezzi et al. ..................... 360/46 |

FOREIGN PATENT DOCUMENTS

| | | |
|---|---|---|
| 63-112872 | 5/1988 | (JP) . |
| 5-291879 | 11/1993 | (JP) . |

* cited by examiner

*Primary Examiner*—Chuong Dinh Ngo
(74) *Attorney, Agent, or Firm*—Greer, Burns & Crain, Ltd.

(57) ABSTRACT

A finite impulse response circuit includes a delay line having a plurality of taps, receiving an input signal, a multiplying part for multiplying coefficients to signals obtained from the taps and adding multiplied results, and a shaping part for shaping the input signal by adjusting the coefficients. The shaping part includes a first tap coefficient setting circuit for correcting a signal distortion which is asymmetrical to right and left with respect to a signal point, and a second tap coefficient setting circuit for correcting a signal distortion which is symmetrical to the right and left with respect to the signal point. The first tap coefficient setting circuit sets the coefficient independently of the second tap coefficient setting circuit.

14 Claims, 8 Drawing Sheets

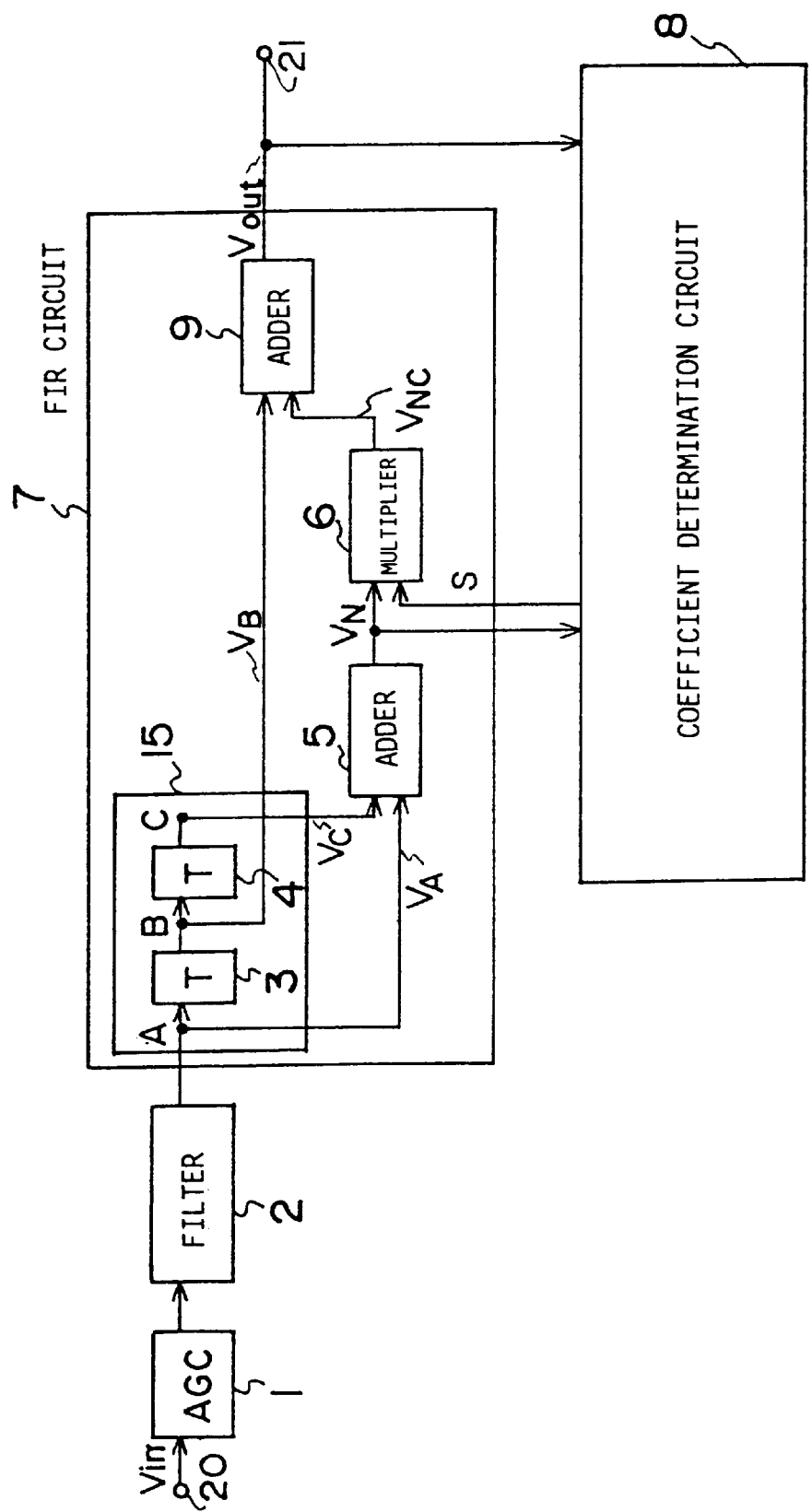

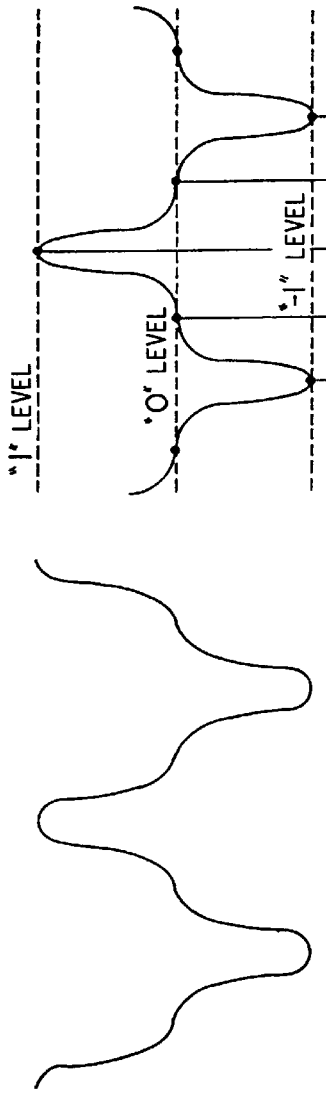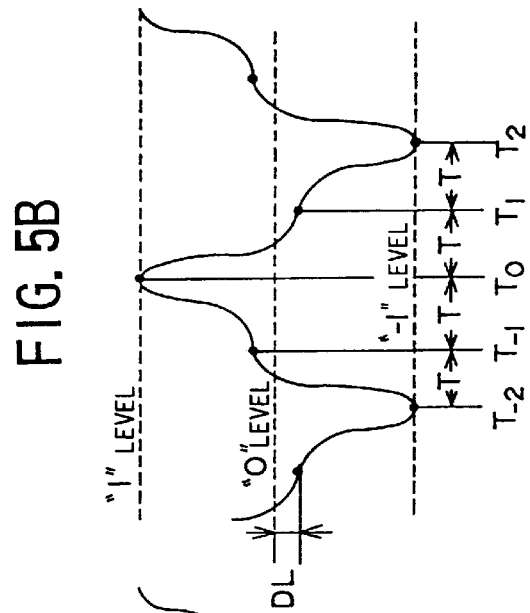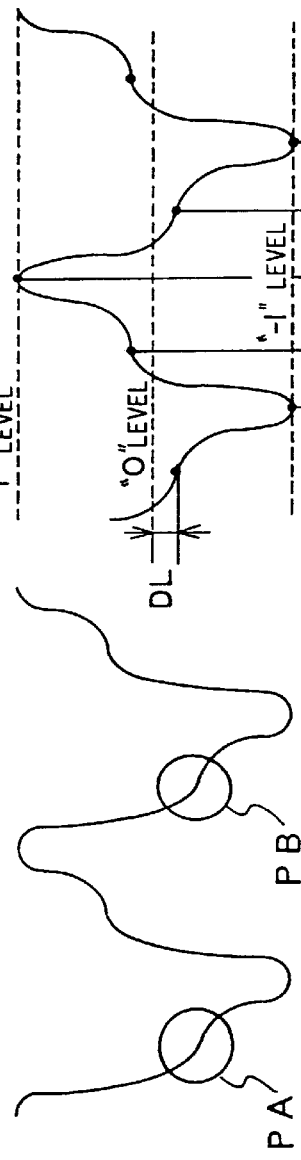

FINITE IMPULSE RESPONSE CIRCUIT AND DISK UNIT

BACKGROUND OF THE INVENTION

The present invention generally relates to finite impulse response (FIR) circuits and disk units, and more particularly to an asymmetric FIR circuit which corrects and eliminates a group delay distortion and to a disk unit which uses such a FIR circuit.

FIG. 1 shows an important part of an example of a hard disk drive (HDD). An external write signal (or data) is recorded on a recording medium 114 such as a magnetic disk via a hard disk controller (HDC) 111, a write circuit 109, a write amplifier 103 of an amplifier part 101 which is indicated by a dotted line, and a magnetic head 115. The recorded signal (or data) on the recording medium 114 is read by the magnetic head 115 and is output to an external unit (not shown) via a read amplifier 102 of the amplifier part 101, an automatic gain control (AGC) circuit 103, a filter 105, a FIR circuit 107, a demodulator 108 and the HDC 111. When carrying out digital signal processing in the FIR circuit 107, the demodulator 108, the HDC 111 and the like, an analog-to-digital converter is provided between the filter 105 and the FIR circuit 107 to convert analog signals into digital signals.

The FIR circuit 107 is a kind of shaping circuit for shaping the signal waveform which is distorted during processes such as writing and reading of the signals and the processes carried out by the AGC circuit 104 and the filter 105. A microprocessor unit (MPU) 112 makes a reference to a memory 113 and sets parameters to the FIR circuit 107.

The read amplifier 102 amplifies a weak signal read by a read head R of the magnetic head 115, and supplies the amplified read signal to a read channel 110 which is indicated by a dotted line.

On the other hand, the write amplifier 103 amplifies the write signal and drives a write head W of the magnetic head 115 depending on the write signal. The write circuit 109 carries out a signal processing with respect to the write signal from the HDC 111 before supplying the write signal to the write amplifier 103.

The AGC circuit 105 is provided to maintain the amplitude of the read signal constant. The filter 105 is provided for noise elimination. Instead of providing the FIR circuit 107 for waveform shaping, it is possible to provide a high-frequency boost circuit. The demodulator 108 converts the read signal into the data "0" and "1".

The HDC 111 connects the HDD to the external unit. The MPU 112 controls the general operation of the HDD, including the setting of the parameters of the FIR circuit 107. The memory 113 stores a firmware of the HDC 111 and various parameter values.

FIG. 2 shows a conventional FIR circuit 7 which may be used as the FIR circuit 107. For the sake of convenience, it is assumed that coefficients are automatically set, that is, the coefficients are determined to optimum or approximately optimum values depending on signal changes.

A read signal Vin applied to an input terminal 20 is supplied to the FIR circuit 7 via an AGC circuit 1 and a filter 2, and an output signal Vout having a shaped waveform is output from the FIR circuit 7 and obtained via an output terminal 21.

The FIR circuit 7 includes a delay line 15, adders 5 and 9, and a multiplier 6 which are connected as shown. The delay line 15 includes an even number of delay circuits 3 and 4 and an odd number of equi-distant taps. Each of the delay circuits 3 and 4 has a delay time T which is approximately equal to a signal time interval. FIG. 2 shows a case where 2 delay circuits 3 and 4, and 3 taps are provided.

A coefficient determination circuit 8 supplies a signal S to one input terminal of the multiplier 6 based on an output signal VN of the adder and the output signal Vout of the FIR circuit 7, so that the output signal Vout of the FIR circuit 7 converges to "0", "1" or "−1".

In this particular case, taps A, B and C are provided in the delay line 15, and the tap B is regarded as a center tap. The number or the order of the taps A through C is determined by regarding the center tap B as a reference. Hence, the center tap B is regarded as a 0th tap, the tap A on the left of the center tap B is regarded as a −1st tap, and the tap C on the right of the center tap B is regarded as a +1st tap.

As described above, the FIR circuit 7 receives the read signal Vin from the input terminal via the AGC circuit 1 and the filter 2. In the FIR circuit 7, the adder 5 adds an output signal $V_A$ of the −1st tap A and an output signal $V_C$ of the +1st tap C. The output signal VN of this adder 5 and the output signal S of the coefficient determination circuit 8 are multiplied in the multiplier 6. The adder 9 adds an output signal $V_B$ of the center (0th) tap B and an output signal VNC of the multiplier 6. As a result, the adder 9 outputs the output signal Vout having the shaped waveform.

Next, a general description will be given of the waveform distortion. FIGS. 3A through 3D are diagrams for explaining the waveform distortion with respect to a single pulse signal.

As shown in FIG. 3A, a normal waveform which is not distorted has a regular level "1" at a signal point T0 and a level "0" at other sampling points.

But in the case of distorted symmetrical waveforms which are symmetrical to the right and left, the waveforms are distorted symmetrically to the right and left about the signal point T0 and the level is not "0" at the sampling points other than the signal point T0, as shown in FIGS. 3B and 3C. FIG. 3B shows the distorted symmetrical waveform which is distorted symmetrically to the right and left, having a level smaller than "1" at the signal point T0. FIG. 3C shows the distorted symmetrical waveform which is distorted symmetrically to the right and left, having a level larger than "1" at the signal point T0 and a level larger than "0" at the sampling points other than the signal point T0. In other words, the signal amplitude is generally smaller than the regular levels in the case of the distorted symmetrical waveform shown in FIG. 3B, and the signal amplitude is generally larger than the regular levels in the case of the distorted symmetrical waveform shown in FIG. 3C.

Further, FIG. 3D shows a distorted asymmetrical waveform which is distorted asymmetrically. When viewed from the signal point T0, the distortion of the distorted asymmetrical waveform shown in FIG. 3D is asymmetrical to the right and left.

Of course, in actual circuits, the distortion is not generated in the single pulse signal as shown in FIGS. 3B through 3D, but is generated due to the mutual effects of pulse signals.

According to the conventional FIR circuit 7, no problem occurs if the read signal Vin has a waveform which is symmetrical to the right and left and includes no distortion as shown in FIG. 4A. In this case, the waveform has the regular levels "0", "1" and "−1" at the sampling points as shown in FIG. 4B.

However, the waveform of the read signal Vin may be distorted as shown in FIG. 5A if the group delay characteristic is not flat for the filter 2, the AGC 1 and the like. In other words, the waveform of the read signal Vin may be distorted asymmetrically to the right and left, as indicated by portions PA and PB in FIG. 5A.

If the read signal Vin is distorted as shown in FIG. 5A, the output signal Vout of the FIR circuit 7 becomes as shown in FIG. 5B, and the asymmetrical distortion cannot be corrected. More particularly, the signal amplitude deviates from the regular level "0", and an erroneous detection of the level "0" is likely to occur.

Particularly due to the increased processing speeds of the recent disk units, it is becoming more and more difficult to design the amplifiers and the filters to satisfy the specifications, and there is a tendency for the group delay distortion to increase. However, the conventional FIR circuit 7 cannot cope with the asymmetrical distortions, and there was a problem in that a read error is easily generated when the conventional FIR circuit 7 is used in disk units.

SUMMARY OF THE INVENTION

Accordingly, it is a general object of the present invention to provide a novel and useful FIR circuit and disk unit, in which the problem described above is eliminated.

Another and more specific object of the present invention is to provide a finite impulse response circuit comprising a delay line having a plurality of taps, receiving an input signal, multiplying means for multiplying coefficients to signals obtained from the taps and adding multiplied results, and shaping means for shaping the input signal by adjusting the coefficients, where the shaping means comprises first tap coefficient setting means for correcting a signal distortion which is symmetrical to right and left with respect to a signal point, and second tap coefficient setting means for correcting a signal distortion which is symmetrical to the right and left with respect to the signal point, and the first tap coefficient setting means sets the coefficient independently of the second tap coefficient setting means. According to the finite impulse response circuit of the present invention, it is possible to correct and eliminate the asymmetrical signal distortion caused by the group delay distortion and the like, by independently setting the coefficients.

Still another object of the present invention is to provide the finite impulse response circuit described above, wherein the coefficient of the first tap coefficient setting means and the coefficient of the second tap coefficient setting means are set externally. According to the finite impulse response circuit of the present invention, it is possible to arbitrarily set the coefficients of the first and second tap coefficient setting means externally.

A further object of the present invention is to provide the finite impulse response circuit described above, wherein the coefficient of the first tap coefficient setting means are set externally, and the coefficient of the second tap coefficient setting means are set automatically. According to the finite impulse response circuit of the present invention, it is possible to arbitrarily set the coefficient of the first tap coefficient setting means externally, and to automatically set the coefficient of the second tap coefficient setting means.

Another object of the present invention is to provide a finite impulse response circuit comprising a delay line having an odd number of taps, receiving an input signal, where each of the taps is provided for every delay time approximately equal to a signal interval of the input signal, first and second multipliers, and first and second adders, wherein the first multiplier is provided between the first adder and one of Nth tap of the delay line and a −Nth tap of the delay line, and multiplies a first coefficient to a signal output from the one of the Nth and −Nth taps, the first adder adds a signal output from the first multiplier and a signal output from the other of the Nth and −Nth taps, the second multiplier multiplies a second coefficient to a signal output from the first adder, and the second adder adds a signal output from a center tap of the delay line and a signal output from the second multiplier, and outputs an output signal of the finite impulse response circuit. According to the finite impulse response circuit of the present invention, it is possible to correct and eliminate the asymmetrical signal distortion caused by the group delay distortion and the like, by independently setting the coefficients.

Still another object of the present invention is to provide the finite impulse response circuit described above, wherein the first coefficient and the second coefficient are set externally. According to the finite impulse response circuit of the present invention, it is possible to arbitrarily set the coefficients of the first and second tap coefficient setting means externally.

A further object of the present invention is to provide the finite impulse response circuit described above, which further comprises a coefficient determination circuit automatically determining the second coefficient so that the output signal of the finite impulse response circuit converges to "0", "1" or "−2", and outputting a signal which is applied to the second multiplier as the second coefficient, where the first coefficient is set externally. According to the finite impulse response circuit of the present invention, it is possible to arbitrarily set the coefficient of the first tap coefficient setting means externally, and to automatically set the coefficient of the second tap coefficient setting means.

Another object of the present invention is to provide the finite impulse response circuit described above, wherein the coefficient determination circuit comprises an error detection circuit obtaining a difference between the output signal of the finite impulse response circuit and an ideal output, a polarity determination circuit determining a direction in which the output signal of the finite impulse response circuit is to be corrected, based on the signal output from the first adder, a third multiplier multiplying an output signal of the polarity determination circuit and an output signal of the error detection circuit, and an integrator integrating an output signal of the third multiplier, and outputting an output signal of the coefficient determination circuit. According to the finite impulse response circuit of the present invention, it is possible to automatically set the second coefficient.

Still another object of the present invention is to provide a disk unit comprising reading means for reading a signal from a disk, and a finite impulse response circuit receiving a read signal from the reading means, where the finite impulse response circuit comprises a delay line having a plurality of taps, receiving the read signal, multiplying means for multiplying coefficients to signals obtained from the taps and adding multiplied results, and shaping means for shaping the read signal by adjusting the coefficients, the shaping means comprising first tap coefficient setting means for correcting a signal distortion which is asymmetrical to right and left with respect to a signal point, and second tap coefficient setting means for correcting a signal distortion which is symmetrical to the right and left with respect to the signal point, the first tap coefficient setting means setting the coefficient independently of the second tap coefficient setting means. According to the disk unit of the present invention, it is possible to correct and eliminate the asymmetrical signal distortion of the read signal caused by the group delay distortion and the like, by independently setting the coefficients.

A further object of the present invention is to provide a disk unit comprising reading means for reading a signal from a disk, and a finite impulse response circuit receiving a read signal from the reading means, the finite impulse response circuit comprising a delay line having an odd number of taps, receiving the read signal, each of the taps being provided for every delay time approximately equal to a signal interval of the input signal, first and second multipliers, and first and second adders, the first multiplier being provided between the first adder and one of Nth tap of the delay line and a −Nth tap of the delay line, and multiplying a first coefficient to a signal output from the one of the Nth and −Nth taps, the first adder adding a signal output from the first multiplier and a signal output from the other of the Nth and −Nth taps, the second multiplier multiplying a second coefficient to a signal output from the first adder, the second adder adding a signal output from a center tap of the delay line and a signal output from the second multiplier, and outputting an output signal of the finite impulse response circuit. According to the disk unit of the present invention, it is possible to correct and eliminate the asymmetrical signal distortion of the read signal caused by the group delay distortion and the like, by independently setting the coefficients.

Other objects and further features of the present invention will be apparent from the following detailed description when read in conjunction with the accompanying drawings.

BRIEF DESCRIPTION OF THE DRAWINGS

FIG. 2 is a system block diagram showing a conventional FIR circuit;

FIGS. 4A and 4B respectively show signal waveforms for explaining a waveform which is symmetrical to the right and left and includes no distortion;

FIGS. 5A and 5B respectively show signal waveforms for explaining a distorted waveform which is asymmetrical to the right and left;

DESCRIPTION OF THE PREFERRED EMBODIMENTS

Figure 1:
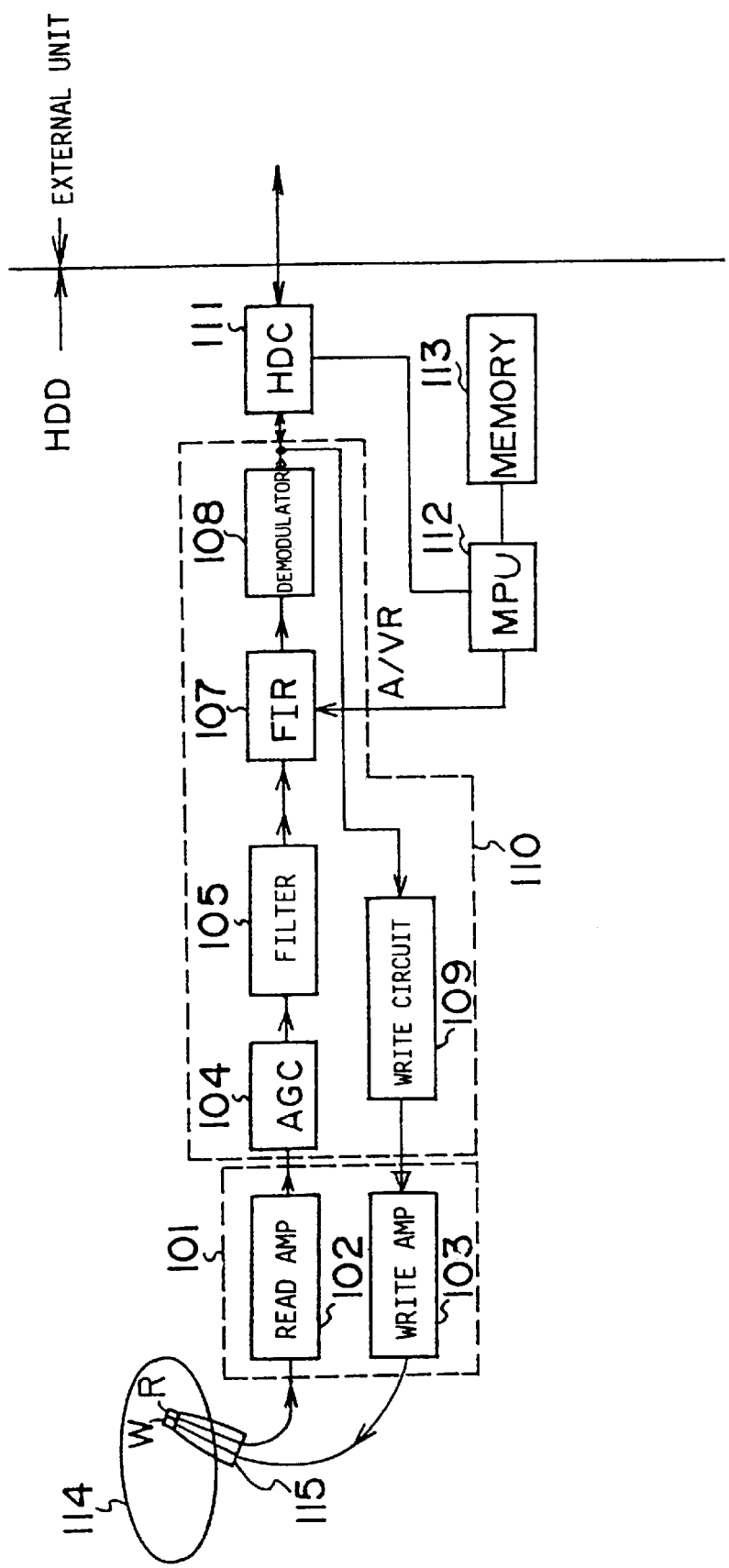
FIG. 1 is a diagram showing an important part of an example of a HDD.
Figure 3A:
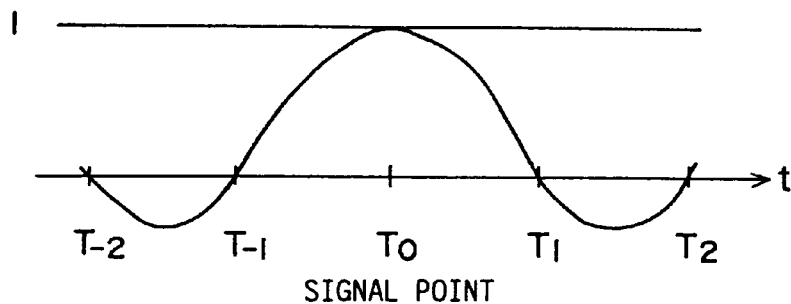
FIGS. 3A through 3D respectively show signal waveforms for explaining a waveform distortion with respect to a single pulse signal.
Figure 3B:
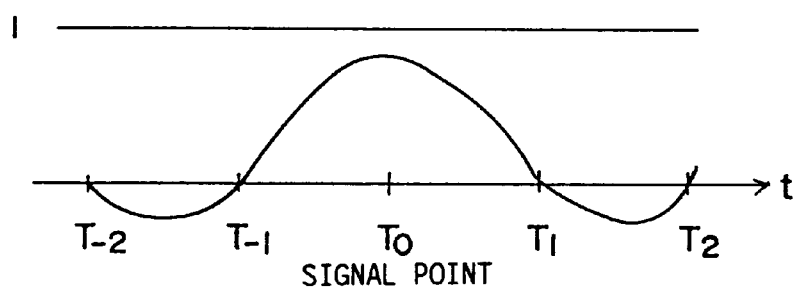
Figure 3C:
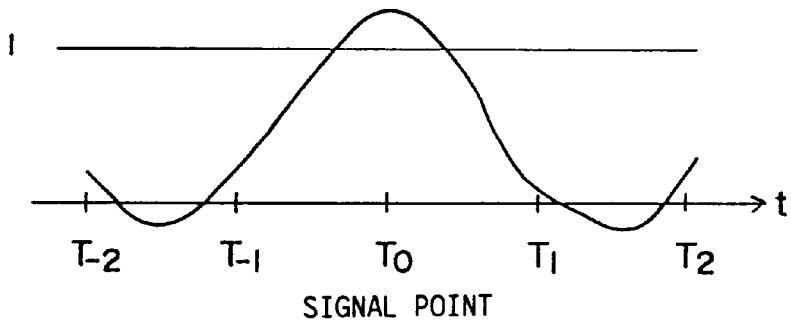
Figure 3D:
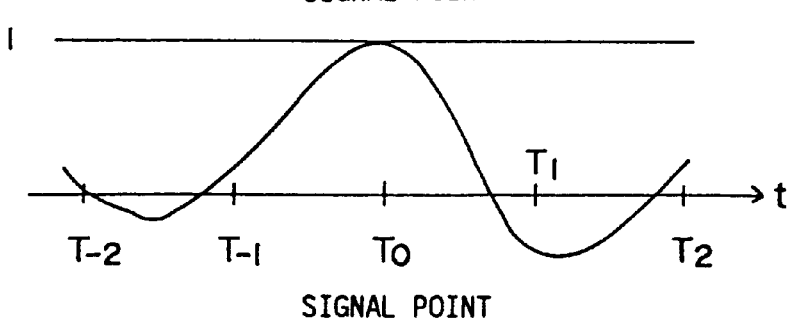

A description will be given of an embodiment of a FIR circuit according to the present invention, by referring to FIGS. 6 through 9. For example, this embodiment of the FIR circuit is used as the FIR circuit 107 shown in FIG. 1 described above. A disk unit such as that shown in FIG. 1, using this embodiment of the FIR circuit, forms an embodiment of a disk unit according to the present invention.

Figure 6:
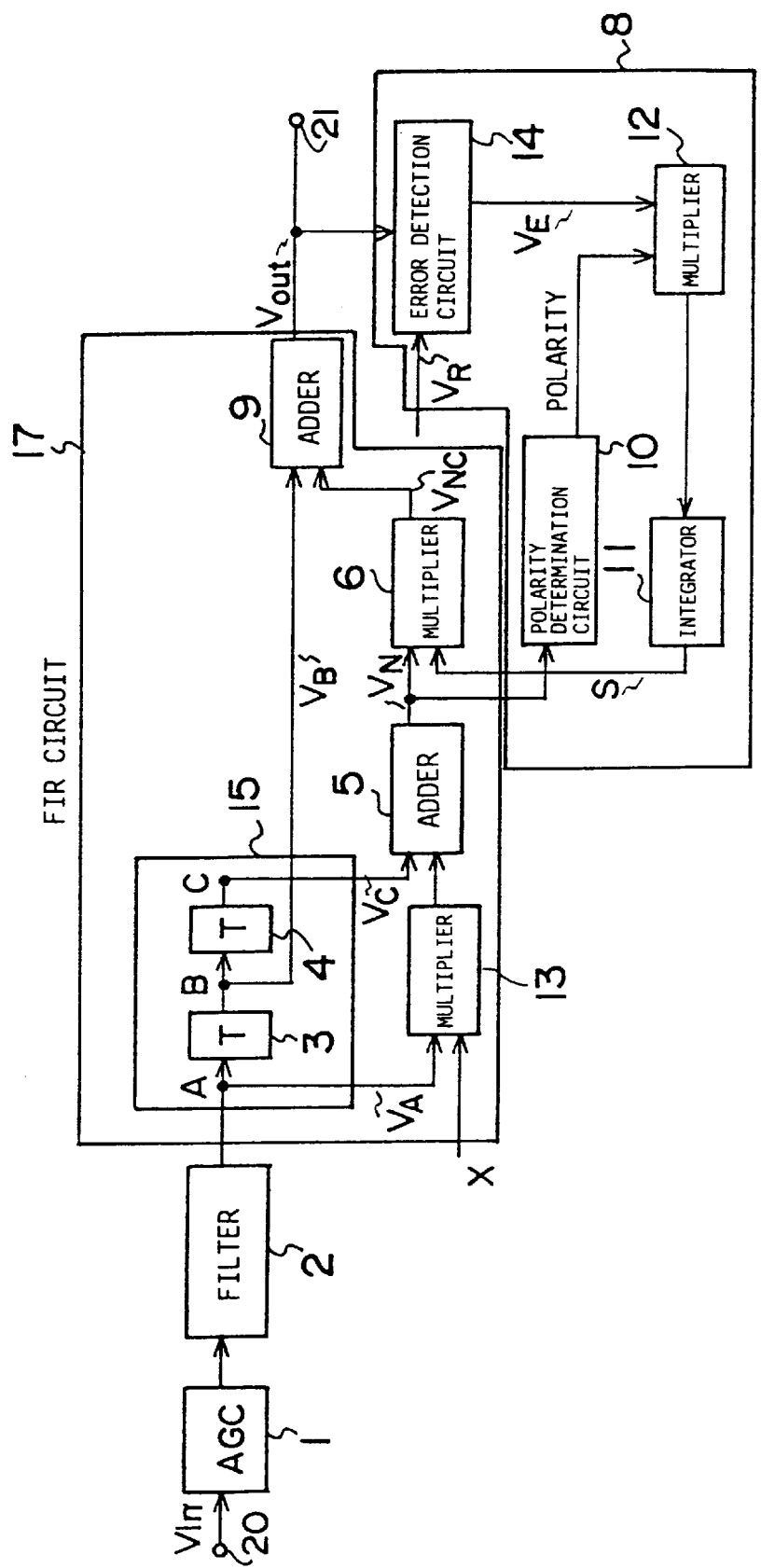
FIG. 6 is a system block diagram showing an embodiment of a FIR circuit according to the present invention.

FIG. 6 shows this embodiment of the FIR circuit. In FIG. 6, those parts which are the same as those corresponding parts in FIG. 2 are designated by the same reference numerals, and a description thereof will be omitted. An AGC circuit 1, a filter 2, a FIR circuit 17 and a coefficient determination circuit 18 are connected as shown in FIG. 6.

A read signal Vin applied to an input terminal 20 is supplied to the FIR circuit 17 via the AGC circuit 1 and the filter 2. As will be described later in mode detail, the FIR circuit 17 includes 2 multipliers, and an output signal Vout having a shaped waveform is output from an output terminal 21 by independently applying to the 2 multipliers coefficients for making a signal correction.

The FIR circuit 17 includes a delay line 15, adders 5 and 9, and multipliers 6 and 13 which are connected as shown in FIG. 6. The delay line 15 includes an even number of delay circuits 3 and 4 and an odd number of equi-distant taps. Each of the delay circuits 3 and 4 has a delay time T which is approximately equal to a signal time interval. FIG. 6 shows a case where 2 delay circuits 3 and 4, and 3 taps are provided.

In this particular case, taps A, B and C are provided in the delay line 15, and the tap B is regarded as a center tap. The number or the order of the taps A through C is determined by regarding the center tap B as a reference. Hence, the center tap B is regarded as a 0th tap, the tap A on the left of the center tap B is regarded as a −1st tap, and the tap C on the right of the center tap B is regarded as a +1st tap.

The coefficient determination circuit 18 includes a polarity determination circuit 10, an integrator 11, a multiplier 12 and an error detection circuit 14 which are connected as shown in FIG. 6. The coefficient determination circuit 18 supplies a signal S to one input terminal of the multiplier 6 based on an output signal VN of the adder 5 and the output signal Vout of the FIR circuit 17, so that the output signal Vout of the FIR circuit 17 converges to "0", "1" "−1".

Figure 7:
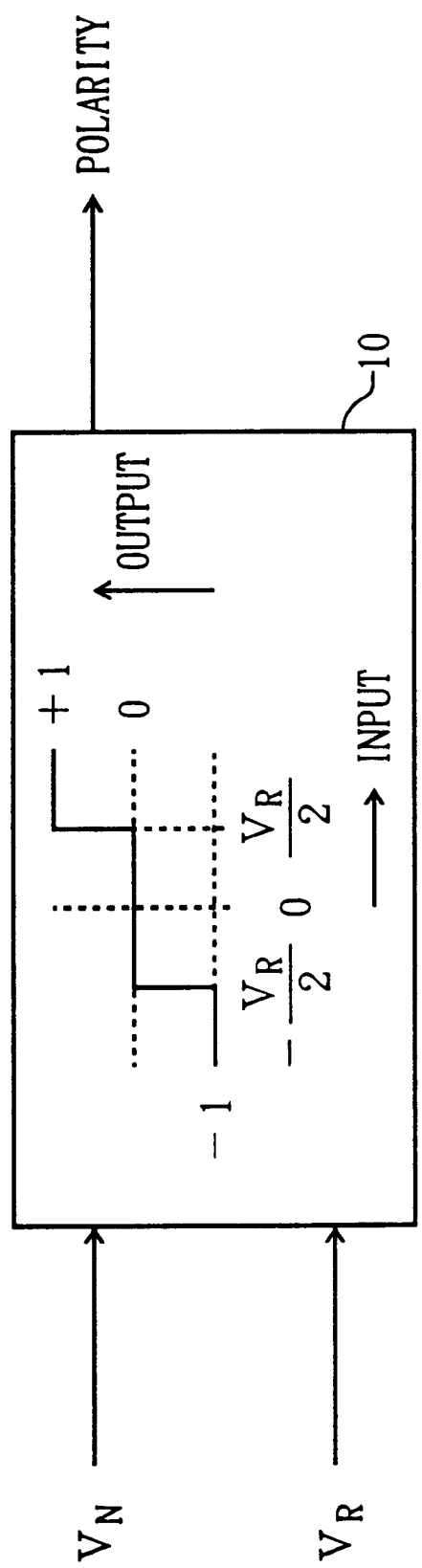
FIG. 7 is a diagram for explaining the function of a polarity determination circuit.

FIG. 7 is a diagram for explaining the function of the polarity determination circuit 10 of the coefficient determination circuit 18. When correcting the output signal Vout, the polarity determination circuit 10 determines whether the correction is to be made in a direction so as to decrease the output signal Vout or in a direction so as to increase the output signal Vout. As shown in FIG. 7, the polarity determination circuit 10 receives the output signal $V_N$ of the adder 5 and a reference potential $V_R$, and compares the output signal $V_N$ and a potential $V_R/2$ or $-V_R/2$. More particularly, the polarity determination circuit 10 outputs a signal (inverted output signal) "−1" if $V_N \leq -V_R/2$, outputs a signal "0" if $-V_R/2 < V_N < V_R/2$, and outputs a signal "1" if $V_N \geq V_R/2$. When $-V_R/2 < V_N < V_R/2$, it is regarded that there is virtually no interference from the adjacent signals, and no signal correction is made when the polarity determination circuit 10 outputs the signal "0".

The reference potential $V_R$ corresponds to a high-level signal "1" output from the output terminal 21. On the other hand, $-V_R$ corresponds to a low-level signal "0" output from the output terminal 21. In this embodiment, the polarity is determined by using the reference potential $V_R$ as a reference, but it is of course possible to use other values as the reference when determining the polarity.

Figure 8:
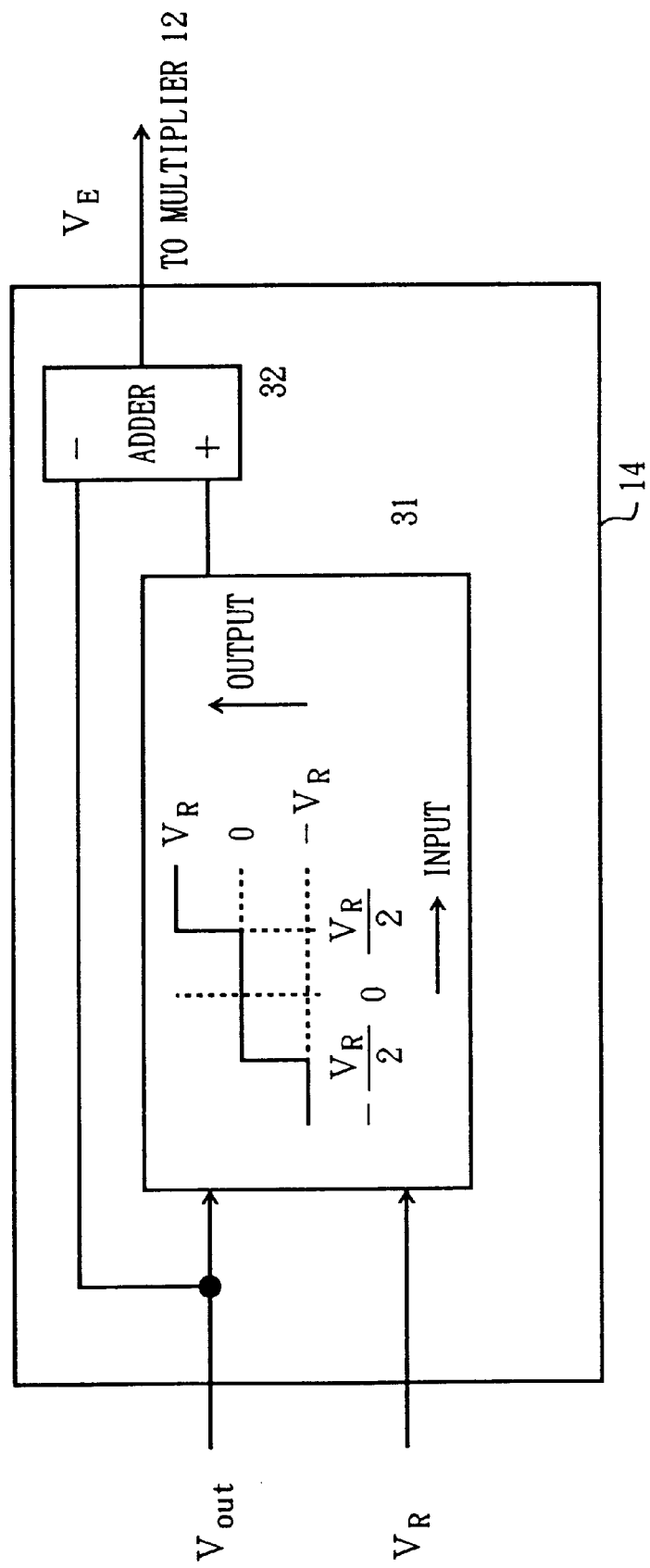
FIG. 8 is a diagram for explaining the function of an error detection circuit.

FIG. 8 is a diagram for explaining the function of the error detection circuit 14 of the coefficient determination circuit 18. As shown in FIG. 8, the error detection circuit 14 includes an amplitude comparator 31 and an adder 32, and detects an error between the output signal Vout from the output terminal 21 and an ideal value. The adder 32 has an inverting input terminal and a non-inverting input terminal, and has the function of obtaining a difference between 2 signals applied thereto. The amplitude comparator 31 receives the output signal Vout from the output terminal 21 and the reference potential $V_R$, and compares the output signal Vout and the potential $V_R/2$ or $-V_R/2$. More particularly, the amplitude comparator 31 outputs a signal $-V_R$ if Vout$\leq -V_R/2$, outputs a signal "0" if $-V_R/2<$Vout$<V_R/2$, and outputs a signal $V_R$ if Vout$\geq -V_R/2$.

The reference potential $V_R$ used by the error detection circuit 14 is the same as the reference potential $V_R$ used in the polarity determination circuit 10. In this embodiment, the error detection is made using the reference potential $V_R$ as a reference, but it is of course possible to use other values as the reference when making the error detection.

The adder 32 obtains the error between the output signal Vout and the ideal value. The output signal Vout is applied to the inverting input terminal of the adder 32, while the output signal of the amplitude comparator 31 is applied to the non-inverting input terminal of the adder 32. An output signal $V_E$ of this adder 32 becomes the output signal of the error detection circuit 14.

Figure 9:
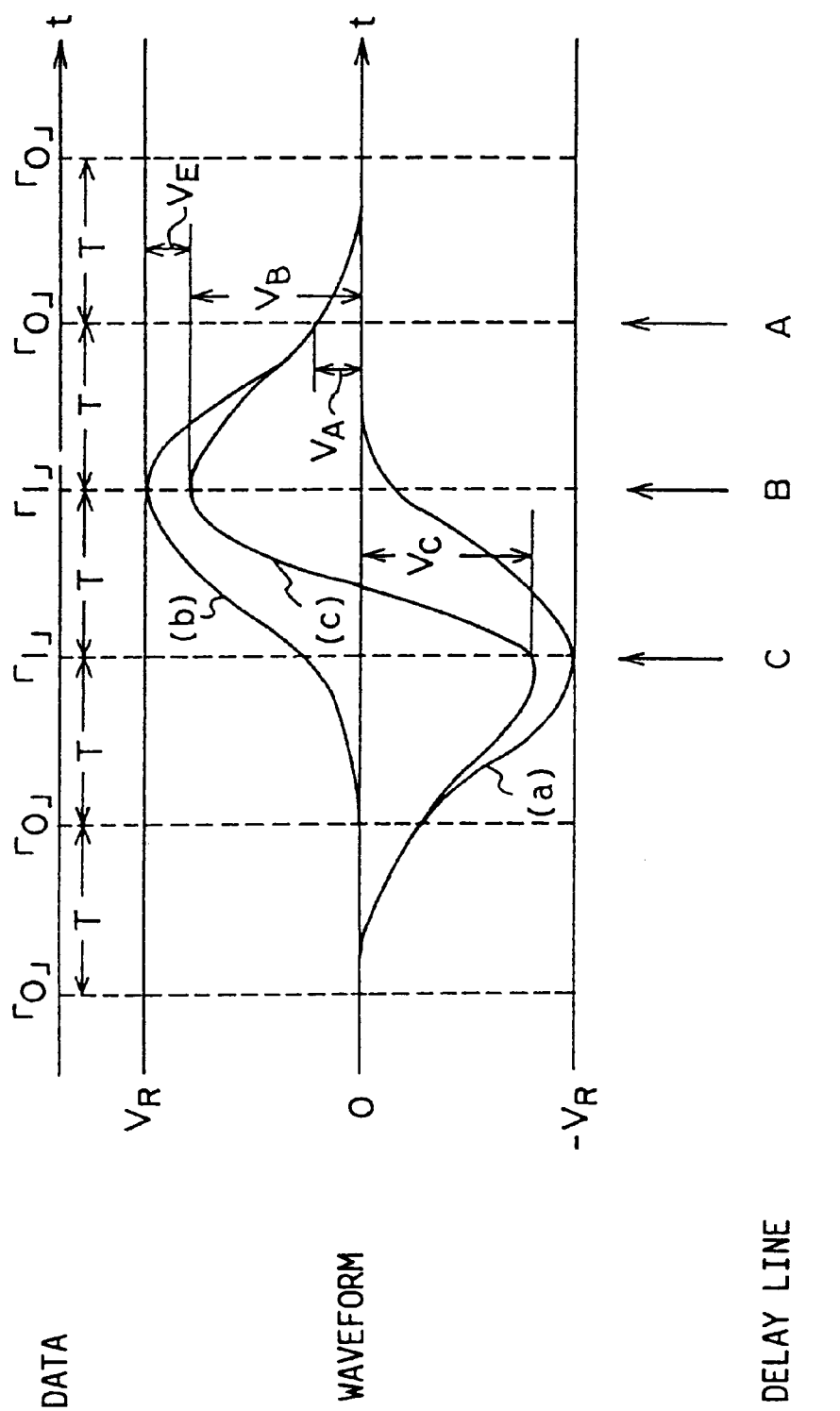
FIG. 9 is a diagram for explaining the operation of a coefficient determination circuit.

FIG. 9 is a diagram for explaining the operation of the coefficient determination circuit 18. For the sake of convenience, it is assumed that the read signal Vin, that is, the data, takes values "0", "0", "1", "1", "0" and "0" as shown in the top portion of FIG. 9. In this case, a signal (c) shown in FIG. 9, which has a waveform obtained by combining a signal (a) and a signal (b), is applied to the delay line 15.

A point in time when a peak of the signal (b) appears at the center tap B of the delay line 15. At this point in time, a potential $V_A$ having a small positive value appears at the tap A, a potential $V_B$ which is $V_E$ lower than the original signal value $V_R$ appears at the center tap B, and a potential $V_C$ which is a large negative value close to $-V_R$ appears at the tap C.

A description will be given of a case where a signal X corresponding to a first coefficient is not applied to the multiplier 13 of the FIR circuit 17. In this case, the output signal $V_N$ of the adder 15 is a sum $(V_A+V_C)$ of the signal $V_A$ obtained at the tap A and the signal $V_C$ obtained at the tap C, The signal $V_A$ has a small positive value, while the signal $V_C$ has a large negative value. For the sake of convenience, it is assumed that the signal $V_N=(V_A+V_C)$ is smaller than $-V_R/2$. Hence, an output signal "−1" is obtained from the polarity determination circuit 10.

The output signal Vout which is not corrected, that is, the signal (c) shown in FIG. 9, has a value which is $V_E$ smaller than $V_R$. This output signal Vout is applied to the amplitude comparator 31 of the error detection circuit 14. If Vout$\geq -V_R/2$, the amplitude comparator 31 outputs the reference potential $V_R$. The adder 32 adds this reference potential $V_R$ and the output signal Vout, and outputs the signal $V_E$ corresponding to the difference between the reference potential $V_R$ and the output signal Vout.

The multiplier 12 multiplies the signal $V_E$ from the error detection circuit 14 and the output signal of the polarity determination circuit 10 which is "−1" in this case. Hence, a signal $-V_E$ is output from the multiplier 12, and integrated into the signal S in the integrator 11. This signal having a negative value is applied to one input terminal of the multiplier 6 of the FIR circuit 17. On the other hand, the signal $V_N$ having a negative value smaller than $-V_R/2$ and close to $-V_R$ is applied to the other input terminal of the multiplier 6. As a result, a positive correction signal $V_{NC}=(S*V_N)$ is output from the multiplier 6 and supplied to the adder 9. The adder 9 adds the signal $V_B$ from the center tap B of the delay line 15 to the output signal $V_{NC}$ of the multiplier 6, so that the signal $V_B$ from the center tap B becomes $V_R$. Therefore, the output signal Vout is corrected from the value $V_B$ to the value $V_R$.

In other words, in the FIR circuit 17, the adder 5 adds the signal $V_A$ from the −1st tap A and the signal $V_C$ from the +1st tap C. If the output signal $V_N$ of the adder 5 is greater than or equal to a predetermined value, the multiplier 6 produces the correction signal $V_{NC}$ by multiplying the output signal $V_N$ of the adder 5 and the output signal S of the coefficient determination circuit 18. The adder 9 adds the correction signal $V_{NC}$ to the signal $V_B$ from the center tap B of the delay line 15, so as to correct the signal waveform, that is, to shape the waveform.

In this case, the tap coefficients are corrected by simultaneously multiplying the same coefficient to the signal $V_A$ from the −1st tap A and the signal $V_C$ from the +1st tap C. Hence, when the signal distortion is symmetrical, it is possible to adjust the levels of the signals "−1", "1" and "0". With respect to the signal (signal at the signal point) appearing at the center tap B, the distortions appearing symmetrically at the taps C and A (sampling points other than the signal point) on the right and left about the center tap B are regarded in this case as being symmetrical signal distortion. However, it is not possible to multiply different coefficients to the signal $V_A$ from the −1st tap A and the signal $V_C$ from the +1st tap C, so as to correct an asymmetrical distortion.

Next, a description will be given of the correction of the asymmetrical distortion. With respect to the signal (signal at the signal point) appearing at the center tap B, the distortions appearing asymmetrically at the taps C and A (sampling points other than the signal point) on the right and left about the center tap B are regarded in this case as being asymmetrical signal distortion.

The waveform of the read signal Vin may be distorted as shown in FIG. 5A if the group delay characteristic is not flat for the filter 2, the AGC 1 and the like. In other words, the waveform of the read signal Vin may be distorted asymmetrically to the right and left, as indicated by portions PA and PB in FIG. 5A. If the read signal Vin is distorted as shown in FIG. 5A, the output signal Vout of the FIR circuit 17 becomes as shown in FIG. 5B, and the asymmetrical distortion cannot be corrected. More particularly, the signal amplitude deviates from the regular level "0", and an erroneous detection of the level "0" is likely to occur. This is because, when the first coefficient X applied to the multiplier 13 is "1", the output signal $V_N$ of the adder 5 becomes "0", and no correction can be made by the coefficient determination circuit 18.

Accordingly, in this embodiment, data related to the signal and waveform distortion with respect to the delay line 15 are measured in advance. Correction data and the like which are obtained as a result of this measurement are stored in the memory 113 shown in FIG. 1. An optimum value corresponding to the first coefficient X is selected from the correction data stored in the memory 113 and is applied to one input terminal of the multiplier 13. This first coefficient X has a value such that the level at the portion PB is corrected by an amount $\Delta L$ to the regular value for the level "0". As a result, the signal shown in FIG. 5A is corrected to have the signal waveform shown in FIG. 4B.

In FIG. 6, the multiplier 6 is provided at a stage after the adder 5. But instead, it is possible to provide a multiplier between the adder 5 and each of the taps A through C of the delay line 15. In this case, it is possible to realize functions similar to those described above by applying the signal from a corresponding one of the taps to one input terminal of each multiplier and applying the output signal S of the coefficient determination circuit 18 to the other input terminal of each multiplier.

In the described embodiment, the coefficient X is set externally, and the signal (coefficient) S is set automatically by the coefficient determination circuit 18. However, it is of course possible to set both the coefficients X and S externally.

Further, the present invention is not limited to these embodiments, but various variations and modifications may be made without departing from the scope of the present invention.

What is claimed is:

1. A finite impulse response circuit comprising:
   a delay line having a plurality of taps, receiving an input signal;
   multiplying means for multiplying coefficients to signals obtained from the taps and adding multiplied results; and
   shaping means for shaping the input signal by adjusting the coefficients,
   said shaping means comprising:
      first tap coefficient setting means for correcting a signal distortion which is asymmetrical to right and left with respect to a signal point; and
      second tap coefficient setting means for correcting a signal distortion which is symmetrical to the right and left with respect to the signal point,
      said first tap coefficient setting means setting the coefficient independently of the second tap coefficient setting means.

2. The finite impulse response circuit as claimed in claim 1, wherein the coefficient of said first tap coefficient setting means and the coefficient of said second tap coefficient setting means are set externally.

3. The finite impulse response circuit as claimed in claim 1, wherein the coefficient of said first tap coefficient setting means are set externally, and the coefficient of said second tap coefficient setting means are set automatically.

4. A finite impulse response circuit comprising:
   a delay line having an odd number of taps, receiving an input signal, each of said taps being provided for every delay time approximately equal to a signal interval of the input signal;
   first and second multipliers; and
   first and second adders,
      said first multiplier being provided between said first adder and one of Nth tap of said delay line and a −Nth tap of said delay line, and multiplying a first coefficient to a signal output from said one of the Nth and −Nth taps,
      said first adder adding a signal output from said first multiplier and a signal output from the other of the Nth and −Nth taps,
      said second multiplier multiplying a second coefficient to a signal output from said first adder,
      said second adder adding a signal output from a center tap of said delay line and a signal output from said second multiplier, and outputting an output signal of the finite impulse response circuit.

5. The finite impulse response circuit as claimed in claim 4, wherein the first coefficient and the second coefficient are set externally.

6. The finite impulse response circuit as claimed in claim 4, which further comprises:
   a coefficient determination circuit automatically determining the second coefficient so that the output signal of the finite impulse response circuit converges to "0", "1" or "−2", and outputting a signal which is applied to said second multiplier as the second coefficient,
   the first coefficient being set externally.

7. The finite impulse response circuit as claimed in claim 6, wherein said coefficient determination circuit comprises:
   an error detection circuit obtaining a difference between the output signal of the finite impulse response circuit and an ideal output;
   a polarity determination circuit determining a direction in which the output signal of the finite impulse response circuit is to be corrected, based on the signal output from said first adder;
   a third multiplier multiplying an output signal of said polarity determination circuit and an output signal of said error detection circuit; and
   an integrator integrating an output signal of said third multiplier, and outputting an output signal of said coefficient determination circuit.

8. A disk unit comprising:
   reading means for reading a signal from a disk; and
   a finite impulse response circuit receiving a read signal from said reading means, said finite impulse response circuit comprising:
      a delay line having a plurality of taps, receiving the read signal;
      multiplying means for multiplying coefficients to signals obtained from the taps and adding multiplied results; and
      shaping means for shaping the read signal by adjusting the coefficients,
      said shaping means comprising:
         first tap coefficient setting means for correcting a signal distortion which is asymmetrical to right and left with respect to a signal point; and
         second tap coefficient setting means for correcting a signal distortion which is symmetrical to the right and left with respect to the signal point,
         said first tap coefficient setting means setting the coefficient independently of the second tap coefficient setting means.

9. The disk unit as claimed in claim 8, wherein the coefficient of said first tap coefficient setting means and the coefficient of said second tap coefficient setting means are set externally.

10. The disk unit as claimed in claim 8, wherein the coefficient of said first tap coefficient setting means are set externally, and the coefficient of said second tap coefficient setting means are set automatically.

11. A disk unit comprising:
    reading means for reading a signal from a disk; and
    a finite impulse response circuit receiving a read signal from said reading means, said finite impulse response circuit comprising:
       a delay line having an odd number of taps, receiving the read signal, each of said taps being provided for every delay time approximately equal to a signal interval of the input signal;
       first and second multipliers; and
       first and second adders,
          said first multiplier being provided between said first adder and one of Nth tap of said delay line and a −Nth tap of said delay line, and multiplying a first coefficient to a signal output from said one of the Nth and −Nth taps,
          said first adder adding a signal output from said first multiplier and a signal output from the other of the Nth and −Nth taps, said second multiplier multiplying a second coefficient to a signal output from said first adder, said second adder adding a signal output from a center tap of said delay line and a signal output from said second multiplier, and outputting an output signal of the finite impulse response circuit.

12. The disk unit as claimed in claim 11, wherein the first coefficient and the second coefficient are set externally.

13. The disk unit as claimed in claim 11, which further comprises:

a coefficient determination circuit automatically determining the second coefficient so that the output signal of the finite impulse response circuit converges to "0", "1" or "−2", and outputting a signal which is applied to said second multiplier as the second coefficient, the first coefficient being set externally.

14. The disk unit as claimed in claim 13, wherein said coefficient determination circuit comprises:

an error detection circuit obtaining a difference between the output signal of the finite impulse response circuit and an ideal output;

a polarity determination circuit determining a direction in which the output signal of the finite impulse response circuit is to be corrected, based on the signal output from said first adder;

a third multiplier multiplying an output signal of said polarity determination circuit and an output signal of said error detection circuit; and an integrator integrating an output signal of said third multiplier, and outputting an output signal of said coefficient determination circuit.

\* \* \* \* \*